J. J. GALLAGHER.
Vehicle Gear.
No. 202,164.  Patented April 9, 1878.
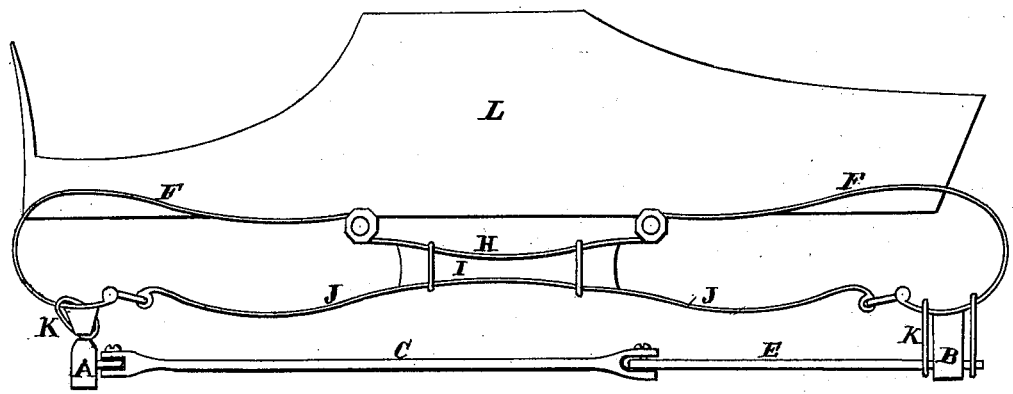
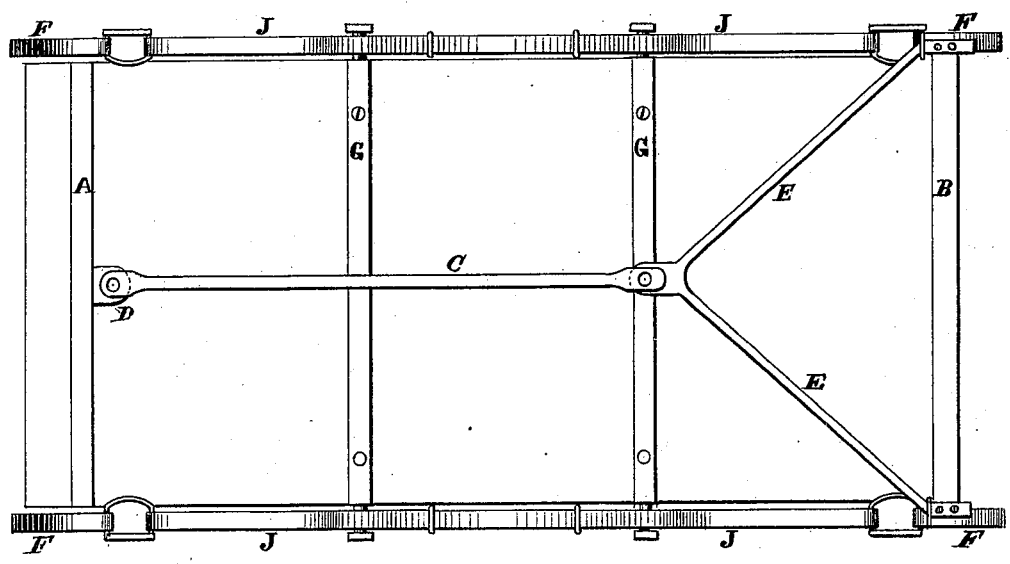

UNITED STATES PATENT OFFICE.

JOSEPH J. GALLAGHER, OF DAVISVILLE, CALIFORNIA.

IMPROVEMENT IN VEHICLE-GEARS.

Specification forming part of Letters Patent No. 202,164, dated April 9, 1878; application filed February 6, 1878.

*To all whom it may concern:*

Be it known that I, JOSEPH J. GALLAGHER, of Davisville, Yolo county, State of California, have invented an Improvement in Carriages; and I do hereby declare the following description and accompanying drawings are sufficient to enable any person skilled in the art or science to which it most nearly appertains to make and use my said invention without further invention or experiment.

My invention relates to certain improvements in the construction of buggies and carriages; and it consists in a novel construction and combination of springs for supporting the buggy, and also in the gearing, as will be more fully described by referring to the accompanying drawings, in which—

Figure 1 is a side elevation, and Fig. 2 is a bottom view.

A is the front and B the rear axle-bed of a buggy or carriage, and C is a reach uniting them. The front end of this reach is secured to the front axle by means of a plate, D, which projects backward from the front axle, and a bolt passes through both parts for that purpose, as shown. A forked brace, E, extends forward from the rear axle, meeting in a V shape beneath the carriage-body, and the rear end of the reach C is bolted to this brace. The springs F F are clipped to the rear axle-bed and bolster, respectively, and curving, as shown. They extend along by the sides of the body, so as to be secured to the ends of bars G, which extend across beneath the body of the vehicle. The ends of these bars are united by a side bar, H, having a bed or block, I, secured beneath it, and so shaped as to receive the center of the spring J, which is secured to the bar and its bed by clips. The ends of this spring are connected by shackles K to the bolster and rear axle-bed, so that the body L of the vehicle is supported by two systems of springs upon each side, so united that they work together, and this gives a very easy motion to the body of the vehicle and a combined support of the load.

Having thus described my invention, what I claim as new, and desire to secure by Letters Patent, is—

1. The reach C, jointed to the front axle by a bolt through the plate D, and to the rear axle by means of the brace E, substantially as herein described.

2. The springs F F, extending from the bars G to the axle and bolster, in combination with the spring J, clipping to the bar H and block I, and connected with the bolster and rear axle-bed by shackles K, substantially as herein described.

In witness whereof I have hereunto set my hand and seal.

JOSEPH J. GALLAGHER. [L. S.]

Witnesses:
ED. F. O'NEAL,
L. J. PLANT.